United States Patent
Guerra, Jr.

(10) Patent No.: US 12,416,498 B1
(45) Date of Patent: Sep. 16, 2025

(54) LASER GUIDE FOR INSTALLING ELECTRICAL PIPE

(71) Applicant: Daniel F. Guerra, Jr., Los Angeles, CA (US)

(72) Inventor: Daniel F. Guerra, Jr., Los Angeles, CA (US)

( * ) Notice: Subject to any disclaimer, the term of this patent is extended or adjusted under 35 U.S.C. 154(b) by 0 days.

(21) Appl. No.: 19/098,256

(22) Filed: Apr. 2, 2025

Related U.S. Application Data (60) Provisional application No. 63/762,333, filed on Feb. 24, 2025.

(51) Int. Cl.
  *G01C 15/00* (2006.01)
  *G01C 9/06* (2006.01)
  *H02G 3/00* (2006.01)

(52) U.S. Cl.
  CPC ............. *G01C 15/008* (2013.01); *G01C 9/06* (2013.01); *H02G 3/263* (2013.01); *G01C 2009/066* (2013.01)

(58) Field of Classification Search
  CPC ............................ G01C 15/004; G01C 15/008
  USPC ........................................... 33/286, 347, 644
  See application file for complete search history.

(56) References Cited

U.S. PATENT DOCUMENTS

| | | | | |
|---|---|---|---|---|
| 5,481,809 A | * | 1/1996 | Rooney | G01C 15/105 33/286 |
| 5,568,265 A | * | 10/1996 | Matthews | G01B 11/27 356/138 |
| 5,644,850 A | * | 7/1997 | Costales | G01C 15/105 33/282 |
| 6,240,649 B1 | * | 6/2001 | McElroy | G01C 15/002 33/529 |
| 6,338,203 B1 | * | 1/2002 | Strickland | G01B 5/24 33/645 |
| 6,438,854 B1 | * | 8/2002 | Kott, Jr. | B25B 5/068 33/286 |
| 6,453,568 B1 | * | 9/2002 | Hymer | G01C 15/008 33/278 |
| 6,487,783 B1 | * | 12/2002 | Thomas, Jr. | B44D 3/38 33/286 |
| 6,532,676 B2 | * | 3/2003 | Cunningham | G01C 15/008 33/286 |

(Continued)

*Primary Examiner* — George B Bennett
(74) *Attorney, Agent, or Firm* — DANE IP Law PC (57) ABSTRACT

The laser alignment device enables precise alignment of electrical metallic tubing (EMT conduit) by projecting a laser beam coaxially aligned with the conduit's central axis. The device features a housing, a laser guide, at least two feet, and a spring mechanism that centers the laser guide automatically to a center of the EMT conduit when attached. In one embodiment, the feet are biased inward to grip the exterior surface of the conduit, while in another, they are biased outward to engage the interior surface. The laser beam indicates the conduit's projected path, allowing electricians to align conduits, mark drilling locations on ceilings or sidewalls, and avoid obstructions. Horizontal or vertical laser lines provide accurate visual guides, eliminating manual measurements and reducing errors caused by irregular structures. The device streamlines installation, ensuring seamless alignment and efficient conduit routing in complex environments. Its durable, adjustable design accommodates various conduit sizes and configurations.

14 Claims, 11 Drawing Sheets

(56) References Cited

U.S. PATENT DOCUMENTS

| | | | | |
|---|---|---|---|---|
| 6,581,294 B2* | 6/2003 | Svaldi | ............... | B25H 7/005 33/529 |
| 6,823,600 B1* | 11/2004 | Vaughan | ............... | G01C 15/004 33/529 |
| 6,834,435 B2* | 12/2004 | Turner | ............... | G01C 9/28 33/529 |
| 6,922,901 B1* | 8/2005 | Chou | ............... | G01C 15/004 33/290 |
| 7,377,045 B2* | 5/2008 | Burry | ............... | G01C 15/105 33/286 |
| 7,886,450 B1* | 2/2011 | Fiano | ............... | G01C 15/105 33/290 |
| 8,266,807 B2* | 9/2012 | Olsen | ............... | G01C 15/12 33/286 |
| 8,668,182 B2* | 3/2014 | Steffen | ............... | G01D 11/30 248/689 |
| 8,893,395 B2* | 11/2014 | Mickow | ............... | G01C 15/002 33/529 |
| 9,651,372 B1* | 5/2017 | Lopez | ............... | G01C 9/24 |
| 10,436,586 B1* | 10/2019 | Davis | ............... | B43L 7/005 |
| 12,023,784 B2* | 7/2024 | Janosch | ............... | G01C 15/004 |
| 2006/0053643 A1* | 3/2006 | Adrian | ............... | G01C 15/002 33/286 |
| 2007/0068020 A1* | 3/2007 | Adrian | ............... | B23Q 17/2404 33/286 |
| 2007/0283584 A1* | 12/2007 | Harari | ............... | G01C 15/008 33/290 |
| 2021/0190494 A1* | 6/2021 | Lindberg | ............... | G01C 15/105 |
| 2022/0395963 A1* | 12/2022 | Draeger | ............... | B25B 5/102 |
| 2023/0324173 A1* | 10/2023 | Sergyeyenko | ............... | F16M 11/18 33/290 |
| 2025/0044086 A1* | 2/2025 | Wright | ............... | G01C 15/004 |
| 2025/0210925 A1* | 6/2025 | Hills | ............... | H01S 3/025 |

* cited by examiner

LASER GUIDE FOR INSTALLING ELECTRICAL PIPE

CROSS REFERENCE TO RELATED APPLICATIONS

This application claims the benefits of Ser. No. 63/762,333, filed on Feb. 24, 2025, the entire content of which is expressly incorporated herein by reference.

STATEMENT RE: FEDERALLY SPONSORED RESEARCH/DEVELOPMENT

Not Applicable.

BACKGROUND

The various aspects and embodiments described herein relate to a laser guide for installing electrical pipe.

Installing electrical metallic tubing (EMT conduit) requires precise alignment to ensure proper routing of electrical wiring through buildings. Traditional methods rely on manual measurements using tape measures or levels to determine the conduit's path and alignment, which can be time-consuming and error-prone, particularly in buildings with uneven floors, sloping surfaces, or non-vertical walls. Misalignment often leads to drilling errors, inefficient installations, and the need for rework. Electricians frequently face additional challenges when bending conduit to navigate around obstacles or when aligning the conduit to pre-drilled holes in ceilings or walls. These tasks require repeated adjustments and can result in significant delays.

Accordingly, there is a need a need in the art for a tool that allow electricians to complete their work efficiently, even in complex or irregular environments.

BRIEF SUMMARY

The laser alignment device provides a precise and efficient solution for aligning electrical metallic tubing (EMT conduit) by projecting a laser beam that is coaxially aligned with the central axis of the conduit. The device includes a housing, a laser guide, feet, and a spring mechanism that automatically centers the laser guide along the conduit. In one configuration, the feet grip the exterior surface of the conduit, while in another, they engage the interior surface. The laser beam serves as a visual guide, allowing electricians to align conduits, mark accurate drilling locations on ceilings and walls, and identify potential obstructions along the conduit's projected path. The device eliminates the need for manual measurements, compensates for structural irregularities, and ensures seamless conduit routing. Its durable construction and adjustable design accommodate various conduit sizes and provide a reliable tool for improving accuracy and efficiency in electrical installations.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The laser alignment device 6 provides electricians with precise guidance for several critical tasks during conduit installation. First, when hanging pipe, the device allows the electrician to determine whether the newly added sections of conduit will encounter any obstructions downstream. The laser guide 24 projects a beam along the conduit's central axis 54, showing its extended path. If the laser beam reaches the intended endpoint without interruption, the electrician knows that connecting additional conduit will result in proper alignment with the destination. However, if the laser beam indicates that the conduit's path intersects another pipe or obstruction, the electrician can adjust the routing to avoid collisions.

Second, the laser alignment device 6 ensures accurate placement of holes when the conduit needs to pass through a wall. The laser beam eliminates the need for manual measurements by directly projecting the path of the conduit, allowing the electrician to mark the precise location for drilling. This eliminates errors caused by uneven or sloped surfaces, ensuring the conduit will align seamlessly through the wall.

Third, in scenarios where the conduit must be directed toward a ceiling or sidewall, the laser alignment device 6 simplifies the process by projecting a horizontal or vertical laser line. This line visually indicates where to drill a hole, removing the need for tape measures and reducing the risk of misaligned connections. By providing a reliable visual guide, the device streamlines installation and ensures precise alignment for a variety of conduit routing tasks.

In the first embodiment, the laser alignment device 6 comprises a housing 8, a laser guide 24, a pair of inwardly biased feet 30, 38, and a spring mechanism that applies equal inward force to the feet 30, 38. By inward, the feet 30, 38 are biased toward each other. The housing 8 forms the structural framework for the device 6, holding all the components in alignment and ensuring their proper interaction. The housing 8 includes a central aperture 22 to mount a laser guide 24 and multiple slots—first left slot 10, first right slot 12, first front slot 14, second left slot 16, second right slot 18, and second front slot 20—that guide the movement of the feet 30, 38. The housing 8 is preferably constructed from lightweight and durable materials such as aluminum alloys, high-strength polymers (e.g., plastic), or stainless steel, which provide rigidity and resistance to environmental conditions. Alternatively, magnesium alloys or reinforced composites may be used to reduce weight or improve durability in demanding environments.

The laser guide 24 may be mounted within the central aperture 22 of the housing 8 and emits a laser beam 52, vertical laser line, horizontal laser line or combinations thereof. The laser alignment device 6 is configured to mount to a pipe so that the laser guide 24 projects the beam coaxially along the central axis 54 of the conduit 4. The laser guide 24 may be a laser pointer or an equivalent mechanism capable of projecting either a single laser beam or a crosshair pattern (e.g., vertical laser line, horizontal laser line) for enhanced visual alignment. When the laser guide 24 projects the vertical laser line or horizontal laser line, the laser guide 24 hangs so that the vertical laser line and horizontal laser line is with respect to gravity. The laser guide 24 is centrally aligned to the center axis of the pipe due to the inwardly biased feet 30, 38. The inwardly biased feet 30, 38 pushes inward with the same force so that after attachment to the pipe, the laser guide 24 is centered to the pipe.

The feet 30, 38 are positioned on opposite sides of the housing 8 and are designed to grip the exterior surface of the EMT conduit 4. Each foot comprises a pair of projections and a base portion. The first foot 30 includes a first left projection 32 and a first right projection 34, which slide within the first left slot 10 and first right slot 12, respectively. Similarly, the second foot 38 includes a second left projection 40 and a second right projection 42, which slide within the second left slot 16 and second right slot 18. The base portions 36, 44 of the feet extend outward and make contact with the conduit surface.

In this embodiment, the inner surfaces 56, 58 of the feet 30, 38 are concave, allowing them to create multiple points of contact with the outer surface of the conduit 4. This concave configuration ensures secure engagement and automatically laterally centers the laser guide 24 along the conduit's central axis 54. The feet may be made from high-strength materials such as stainless steel, reinforced polymers, or carbon fiber composites to provide durability and resistance to wear. For added versatility, the concave surfaces may feature textured or rubberized coatings to improve grip and reduce the risk of slippage during operation.

The spring mechanism is operatively connected to the feet 30, 38 and biases them inward with equal force. The spring mechanism, which may consist of coil springs or leaf springs made from spring steel or composite materials, ensures that the feet consistently apply equal pressure to the conduit's exterior surface. This equal force centers the housing 8 and the laser guide 24 along the conduit's central axis without requiring manual adjustments. The spring rate, measured in pounds per inch (lbs/inch), is selected to provide sufficient biasing force while allowing the feet to accommodate variations in conduit diameter. For example, standard spring rates may be calibrated to align conduits with diameters ranging from ½ inch to 4 inches.

Figure 2:
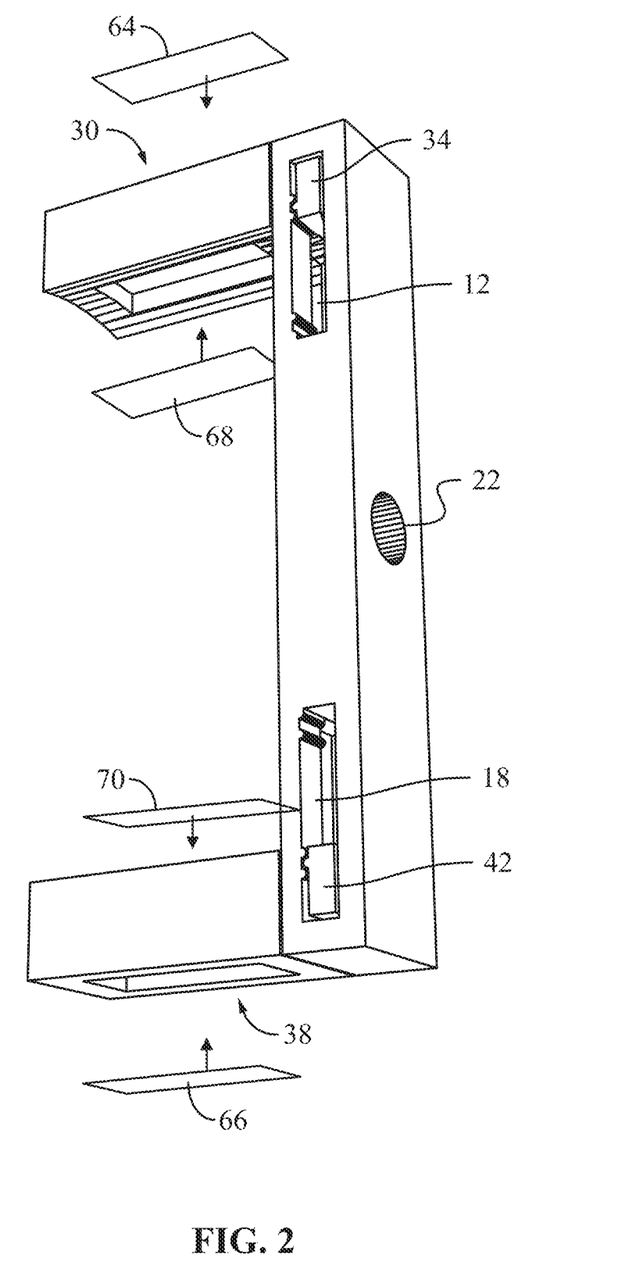
FIG. 2 is a side view of the laser alignment device, illustrating the positioning of the feet and the laser beam projecting along the central axis of the conduit.

The lengths 48, 50 of the feet, as shown in FIG. 2, are sufficient to ensure stability and alignment across common EMT conduit sizes. When mounted, the feet 30, 38 grip the outer surface of the conduit, and the laser guide 24 projects the beam 52 coaxially along the central axis 54. This setup eliminates the need for electricians to measure distances or angles manually. The device permits electricians to not take measurements off of bypasses uneven surfaces, such as sloped floors or non-vertical walls, when installing pipe downstream.

Figure 6:
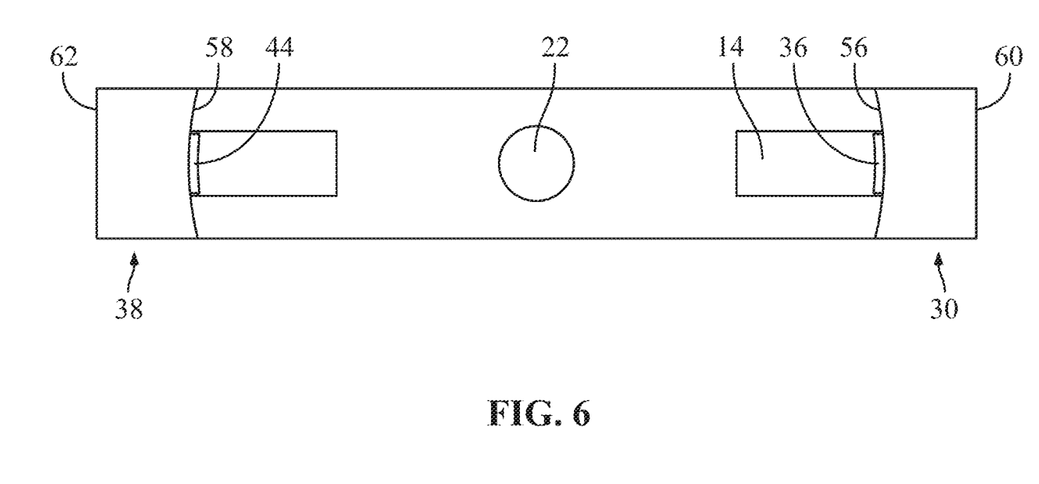
FIG. 6 is a diagram showing the laser alignment device projecting a laser beam toward a ceiling, demonstrating how it is used to mark the location for drilling a hole.
Figure 7:
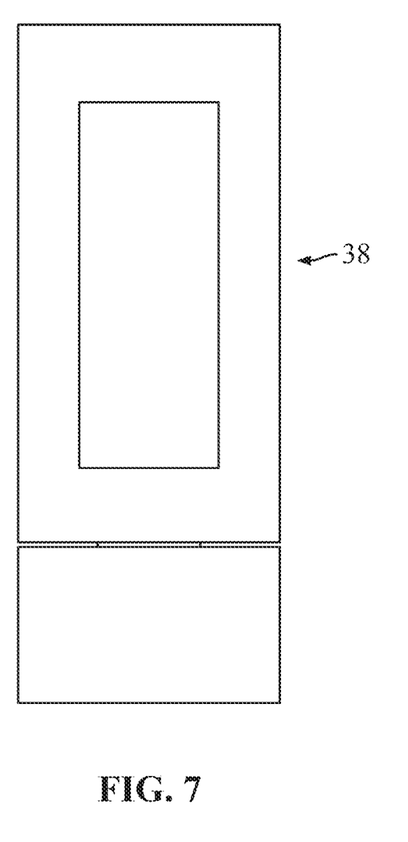
FIG. 7 is a diagram showing the laser alignment device projecting a horizontal laser line toward a sidewall, illustrating its use in marking a precise drilling location.

In practical use, the laser alignment device 6 is attached to the end of an EMT conduit 4. Once the feet 30, 38 are positioned over the conduit's outer surface, the spring mechanism automatically centers the laser guide 24. The laser beam 52 projects the conduit's path, indicating where the conduit would extend if additional conduits were connected continuously in a straight line. This simplifies the process of drilling holes in walls or ceilings, as the laser beam precisely marks the point of penetration. FIG. 6 illustrates the device mounted on a conduit, projecting a laser beam along its axis. This eliminates errors caused by uneven measurement practices and provides a direct visual guide for conduit alignment.

The first embodiment is particularly useful in scenarios where conduits must pass through structural barriers. For example, an electrician can use the laser alignment device 6 to determine the exact point where the conduit will exit a wall or ceiling, ensuring proper alignment with pre-existing holes or target locations. By eliminating the need for manual height or lateral measurements, the device reduces installation time and improves accuracy. The concave configuration of the feet enhances stability on the outer surface of the conduit, even in challenging installation environments.

Figure 1:
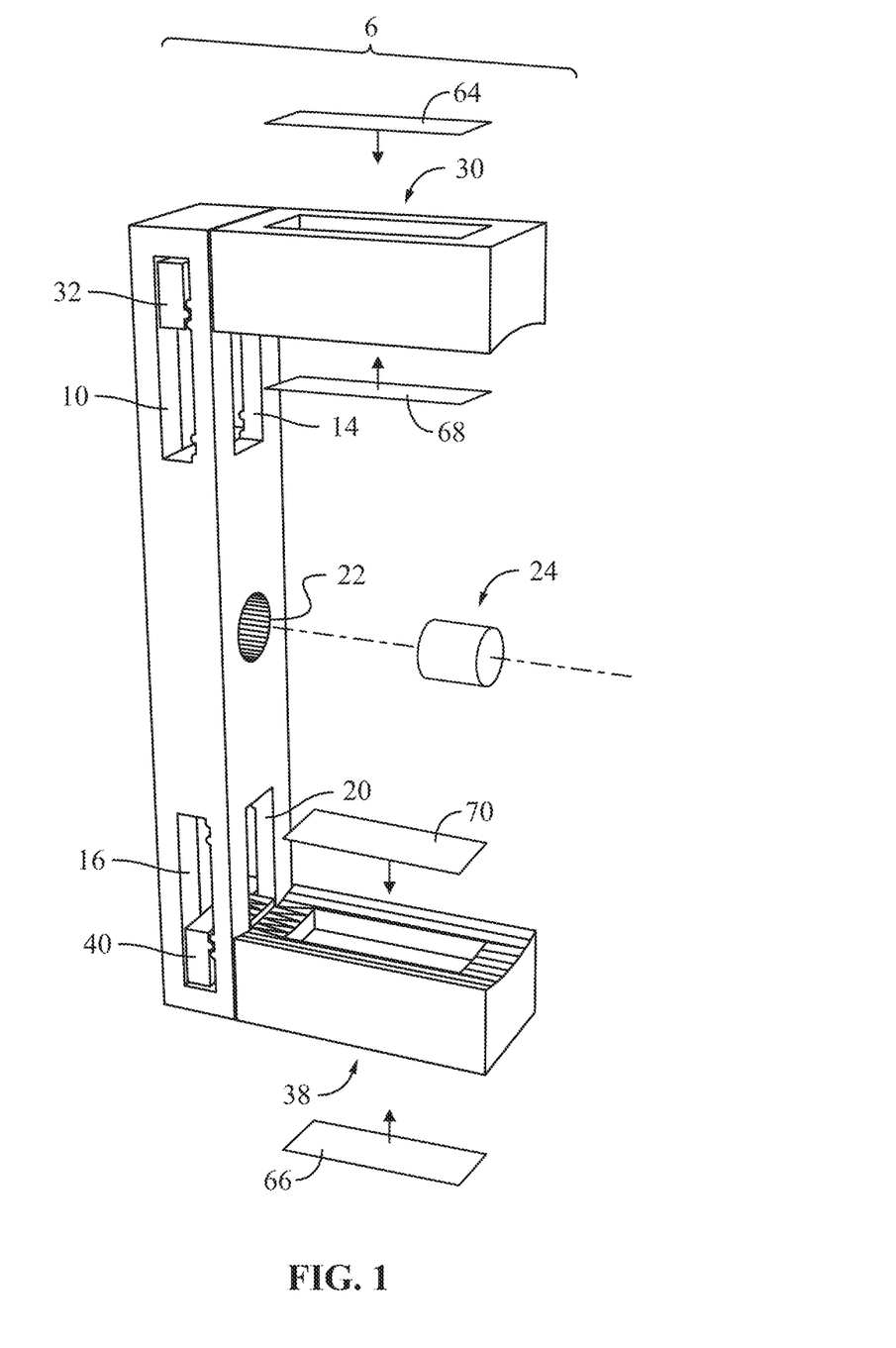
FIG. 1 is a perspective view of the laser alignment device attached to an electrical conduit, showing the main components including the housing, laser guide, and feet.
Figure 4:
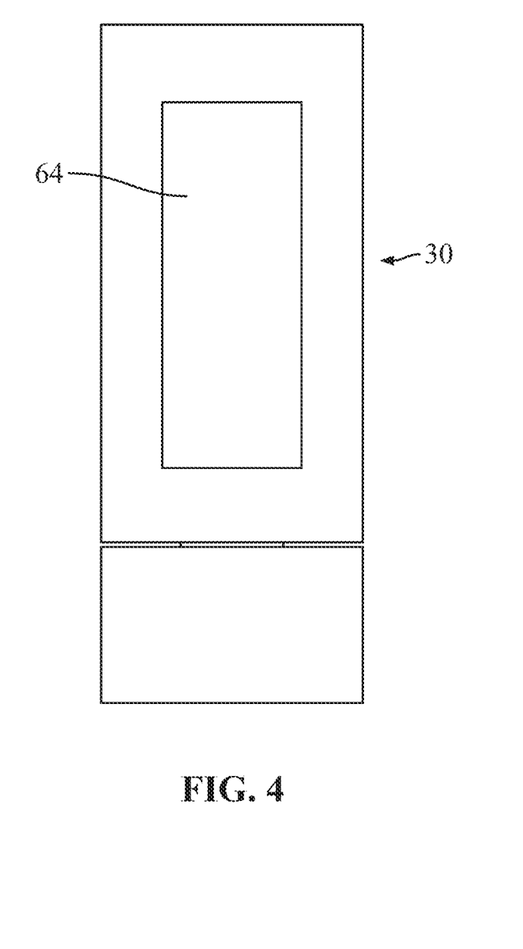
FIG. 4 is a close-up cross-sectional view showing the feet gripping the exterior surface of the conduit in the first embodiment, with the spring mechanism biasing the feet inward.

FIGS. 1A, 2, and 4 illustrate the structural components and operation of the first embodiment in detail. FIG. 1A shows the housing 8, laser guide 24, and feet 30, 38 in their assembled configuration. FIG. 2 highlights the lengths 48, 50 of the feet, which accommodate standard conduit sizes. FIG. 4 depicts the concave inner surfaces 56, 58 of the feet, emphasizing their contact points with the conduit's outer surface.

Figure 5:
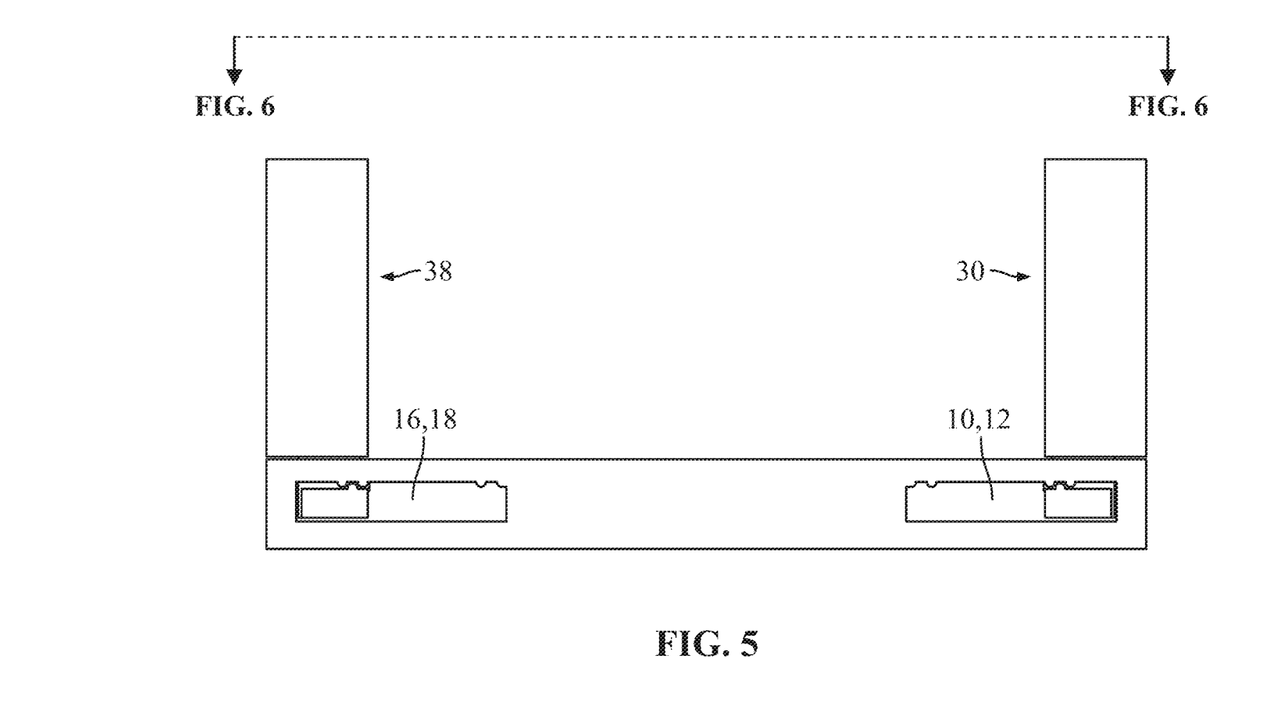
FIG. 5 is a detailed view of the slots in the housing and the locking projections that can hold the feet in place for manual adjustments.

The laser alignment device 6 in the first embodiment may include optional features for enhanced functionality. For instance, the housing 8 may incorporate locking projections 46 (see FIG. 5) within the slots to hold the feet 30, 38 in place manually. This allows electricians to adjust the alignment manually if the spring mechanism is not used. The device may also include additional stabilizing features, such as bubble levels or gyroscopic mechanisms, for use in complex installations.

In summary, the first embodiment of the laser alignment device 6 provides a reliable, efficient solution for aligning EMT conduits. By leveraging inwardly biased feet that grip the outer surface of the conduit, the device ensures accurate, coaxial alignment of the laser beam 52 with the conduit's central axis 54. This automatic centering mechanism eliminates the need for manual measurements, reducing errors and improving installation efficiency in electrical projects.

The second embodiment of the laser alignment device 6 is configured such that the feet 30, 38 are biased outward to contact the interior surface of the EMT conduit 4. This design allows the device to align the laser guide 24 coaxially with the central axis 54 of the conduit by expanding within its interior diameter, providing a secure and precise alignment mechanism without relying on exterior contact.

In this configuration, the feet 30, 38 operate in a similar manner to the first embodiment but with the opposite biasing force. The spring mechanism, rather than pulling the feet inward, applies equal outward force, pressing the feet against the interior wall of the conduit 4. This ensures that the housing 8 and the laser guide 24 are centered along the conduit's central axis 54. The spring mechanism, which may consist of coil or leaf springs made of spring steel or other elastic materials, is calibrated to apply sufficient outward pressure to accommodate standard conduit sizes while maintaining consistent alignment. This outward biasing force compensates for any variations in the conduit's inner surface, ensuring the laser beam 52 remains aligned with the axis.

The outer surfaces 60, 62 of the feet 30, 38 are designed for this interior engagement. Depending on the requirements, the outer surfaces may feature a convex configuration to match the curvature of the conduit's interior, providing full-surface contact for stability. Alternatively, the outer surfaces may have a flat configuration, allowing the edges of the feet to press against the interior surface at 2 distinct edge contacts. Both configurations ensure that the feet securely grip the interior wall and center the laser guide 24 automatically.

The lengths 48, 50 of the feet remain sufficient to maintain stability and alignment across standard conduit diameters. As with the first embodiment, the feet are constructed from robust materials such as stainless steel, aluminum, or reinforced polymers. For environments requiring additional durability or reduced weight, carbon fiber composites or coated metals may be used. The material choice ensures resistance to wear and deformation, even with repeated use in demanding conditions.

The operation of the second embodiment begins by compressing the feet 30, 38 inward manually to allow their insertion into the open end of the conduit 4. Once inserted, the spring mechanism biases the feet outward, pressing their outer surfaces 60, 62 against the conduit's interior wall. This action centers the laser guide 24 within the conduit, enabling the laser beam 52 to project coaxially along the central axis 54. The outward biasing force eliminates the need for manual adjustments and ensures precise alignment.

The second embodiment is particularly useful in scenarios where accessing the conduit's exterior surface is impractical, such as when the conduit is partially embedded in a structure or surrounded by other obstructions. By relying on interior contact for alignment, the device can be used in a broader range of installation environments. Additionally, this embodiment is ideal for situations where the conduit's outer surface is uneven or damaged, as the interior surface typically provides a more consistent alignment reference.

Optional features of the second embodiment include locking projections 46 (see FIG. 5) within the slots 10, 12, 14, 16, 18, and 20 of the housing 8, allowing the feet 30, 38 to be fixed in place for manual adjustment. This feature is useful in situations where precise alignment is needed without relying on the spring mechanism. The housing 8 may also include stabilizing features such as integrated bubble levels or gyroscopic mechanisms to further enhance alignment accuracy.

In summary, the second embodiment of the laser alignment device 6 provides an effective solution for aligning EMT conduits by expanding the feet outward to contact the interior surface of the conduit. The outward equal biasing force ensures precise, automatic centering of the laser guide 24 along the conduit's central axis 54, enabling accurate projection of the laser beam 52. This embodiment expands the utility of the device to include installations where the exterior surface of the conduit is inaccessible or unsuitable for alignment. By providing consistent alignment without manual measurements, the second embodiment ensures reliable and efficient performance in a wide range of electrical installation scenarios.

The first use case of the laser alignment device 6 demonstrates its ability to eliminate manual measurements when aligning EMT conduits to pass through walls, ceilings, or other structural barriers. This use case highlights how the device projects a laser beam 52 coaxially aligned with the central axis 54 of the conduit, enabling electricians to mark the precise point where the conduit will intersect the structure without relying on traditional measuring tools. The device's automatic centering mechanism ensures accuracy, even when floors are sloped or walls are not perfectly vertical.

In this scenario, the electrician attaches the laser alignment device 6 to the open end of an EMT conduit 4. For the first embodiment, the inwardly biased feet 30, 38 grip the outer surface of the conduit securely, with the spring mechanism applying equal force to both feet to center the housing 8 and the laser guide 24. The concave inner surfaces 56, 58 of the feet create multiple points of contact, ensuring that the device aligns itself automatically along the conduit's central axis 54. For the second embodiment, the electrician compresses the feet inward to insert them into the conduit's open end. Once released, the spring mechanism biases the feet outward, causing their convex or flat outer surfaces 60, 62 to engage the interior wall of the conduit and center the laser guide 24.

Once the laser alignment device 6 is secured, the laser guide 24 projects a focused laser beam 52 along the conduit's central axis 54. This beam extends forward in a straight line, visually indicating the path the conduit would follow if extended. The electrician can then use the laser beam to determine the precise location where the conduit will intersect the target surface, such as a wall or ceiling. This eliminates the need to take height or lateral measurements manually, which can introduce errors due to uneven or irregular surfaces.

For example, in traditional methods, the electrician would measure the height of the conduit from the floor and its lateral distance from a reference point, such as a wall or corner. The electrician would then replicate these measurements at the target surface to mark the intersection point. However, this approach is prone to inaccuracies because walls may not be perfectly vertical, floors may slope toward a drain, or structural elements may shift during construction. By contrast, the laser alignment device 6 provides a direct visual projection of the conduit's path, ensuring precise alignment regardless of these inconsistencies.

In this use case, the laser beam 52 acts as a guide for drilling holes in the target surface. The electrician simply marks the point where the laser beam intersects the wall or ceiling and drills at that location. Because the laser beam is coaxially aligned with the central axis 54 of the conduit, the hole will align perfectly with the conduit's path, allowing for seamless passage of the conduit through the structure. This process saves time by eliminating the need to reposition ladders or tools repeatedly to verify measurements.

The primary advantage of this use case is its ability to eliminate manual measuring errors, wherein structural surfaces are not perfectly flat or level. By providing a direct, coaxial laser projection, the device compensates for these imperfections, ensuring that the conduit's path aligns precisely with the intended target. Additionally, the automatic centering mechanism of the laser alignment device 6 reduces the effort required to achieve alignment, allowing electricians to focus on other aspects of the installation process.

In summary, the first use case showcases the laser alignment device 6 as a reliable tool for determining the exact intersection point of an EMT conduit with a wall, ceiling, or other structural barrier. By projecting a coaxially aligned laser beam 52, the device eliminates the need for manual measurements, improves accuracy, and streamlines the installation process. This capability is particularly beneficial in complex or irregular construction environments, where traditional measuring methods may fail to provide consistent results.

The second use case of the laser alignment device 6 focuses on helping electricians visualize whether a bent conduit will intersect other pipes or structures along its projected path. This capability is particularly important in environments with multiple conduits, support structures, or other obstructions where ensuring proper routing is critical. By projecting a laser beam 52 coaxially aligned with the central axis 54 of the conduit, the device eliminates guesswork and allows the electrician to verify alignment before finalizing the installation.

When EMT conduit 4 is bent—whether upward, downward, or at an angle—the path of the conduit changes direction, potentially leading to unintended intersections with other components. In this use case, the electrician attaches the laser alignment device 6 to the open end of the bent conduit. The device automatically centers itself along the conduit's central axis using its inwardly biased feet 30, 38 (first embodiment) or outwardly biased feet (second embodiment). Once attached, the laser guide 24 projects a beam along the bent axis, extending beyond the conduit to visualize its continuation.

For instance, if a conduit is bent upward at a 90-degree angle toward a ceiling, the laser beam will indicate the extended path of the conduit as if it were continued in a straight line from the bend. This projection allows the electrician to see if the conduit would intersect another pipe, structural component, or fixture along its path. If the laser beam shows that the conduit's projected path is clear, the electrician can proceed with confidence, knowing that the routing is correct. However, if the beam indicates a potential collision, the electrician can make adjustments to the bend angle or reposition the conduit before finalizing the installation.

This use case is particularly beneficial in complex environments, such as utility rooms, ceilings with pre-installed infrastructure, or tight spaces where multiple conduits are routed close to one another. Without the laser alignment device 6, electricians might rely on manual measurements or trial-and-error adjustments to determine whether a bent conduit's path is clear, both of which are time-consuming and prone to errors. By providing a visual representation of the conduit's extended path, the laser alignment device 6 streamlines the process and improves accuracy.

Additionally, this use case extends to scenarios where conduits must be routed through areas with irregular or uneven surfaces. For example, if a conduit must bend to navigate around an obstacle, such as a pipe or HVAC duct, the laser beam enables the electrician to adjust the bend angle dynamically to ensure the path remains clear. The device reduces the need for rework, saving time and improving efficiency.

Figure 8:
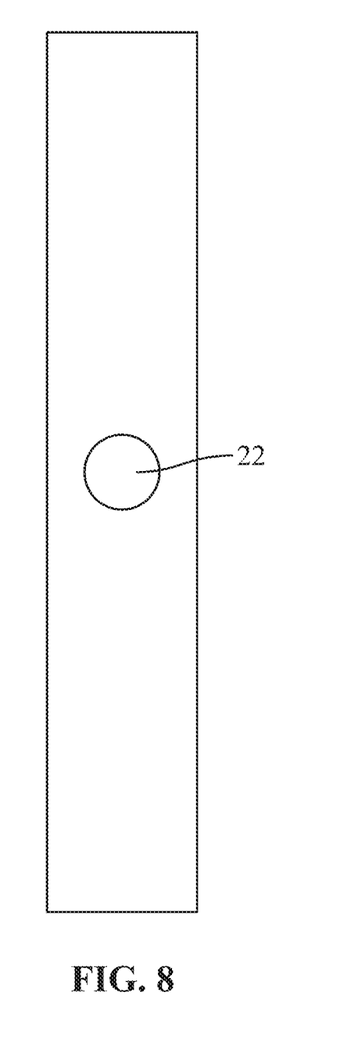
FIG. 8 is a diagram showing the extended path of the laser beam, ensuring alignment of the conduit and avoidance of obstacles or other conduits.
Figure 9:
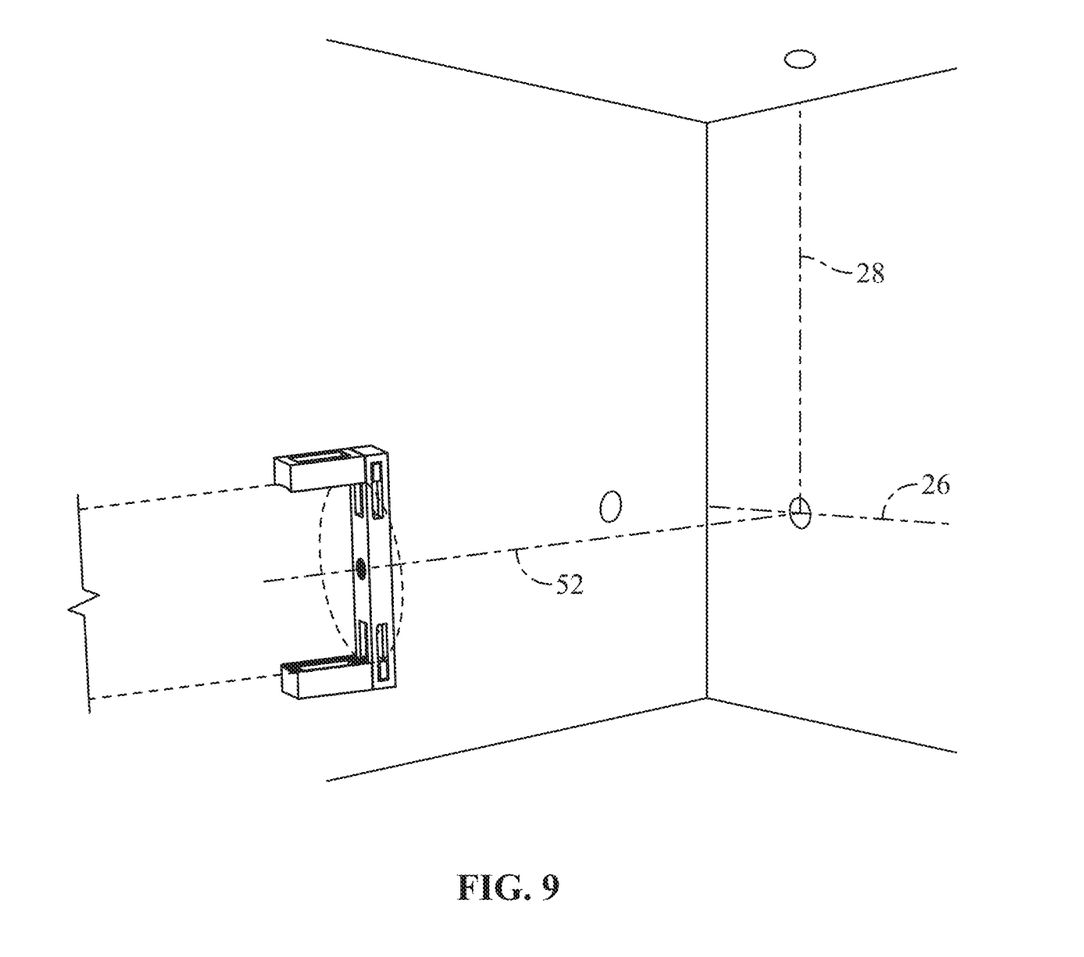
FIG. 9 illustrates the device in use.

FIGS. 6 and 8 illustrate the functionality of this use case. In FIG. 6, the laser alignment device 6 is attached to a bent conduit, with the laser beam projecting along the extended axis of the conduit. FIG. 8 shows a detailed view of the projected laser beam intersecting with or avoiding obstacles, providing real-time feedback to the electrician.

The third and fourth use cases of the laser alignment device 6 demonstrate its ability to guide electricians in accurately directing EMT conduits to ceilings or sidewalls and marking precise drilling locations for accurate conduit installation. These use cases eliminate the need for manual measurements, reducing errors caused by structural irregularities such as uneven floors, sloping surfaces, or non-vertical walls. By projecting horizontal or vertical laser lines, the device provides a reliable visual reference for identifying exact drilling locations, streamlining the installation process.

In these scenarios, the laser alignment device 6 is attached to the open end of the EMT conduit 4. The device centers itself automatically along the conduit's central axis 54 using inwardly biased feet 30, 38 (in the first embodiment) or outwardly biased feet (in the second embodiment). Once secured, the laser guide 24 emits a laser beam 52 along the conduit's axis, either as a focused beam or as part of a horizontal laser line 26 or vertical laser line 28, depending on the installation requirements. This laser projection serves as a direct visual indicator of the conduit's path.

When the conduit is directed toward a ceiling, the laser guide 24 projects a vertical laser line 28 upward to visually indicate the exact point on the ceiling where the conduit would intersect if extended. The electrician can use this line to mark the location for drilling a hole, ensuring the conduit aligns perfectly with the target. For example, if the conduit is bent upward toward a ceiling, the laser line eliminates the need for manual height and side measurements, allowing the electrician to identify the correct drilling location with precision.

Similarly, when the conduit must connect to a sidewall, the laser guide 24 projects a horizontal laser line 26, which visually marks the drilling location on the wall. For instance, if the conduit is bent laterally at a 90-degree angle to reach a sidewall, the laser alignment device 6 projects the line directly onto the wall, allowing the electrician to mark the exact point for drilling. This ensures that the bent conduit aligns seamlessly with the drilled hole, avoiding any offsets or misalignments that could disrupt the installation.

By providing a straight and level laser projection, the device compensates for irregularities in the surrounding environment. For example, floors may slope toward drains or walls are not perfectly perpendicular, traditional manual measurements could result in inaccuracies, requiring repeated adjustments and rework. The laser alignment device 6 eliminates these issues by providing an immediate and accurate visual reference, ensuring that the conduit's path remains correctly aligned with the ceiling or sidewall.

These use cases also apply when electricians must connect conduits to pre-drilled holes in structural elements. For example, the laser alignment device 6 can verify whether a conduit, when bent toward a pre-drilled hole in a ceiling or sidewall, will align properly with the hole before installation. This avoids the need for trial-and-error adjustments and significantly reduces installation time.

In summary, the combined third and fourth use cases demonstrate the laser alignment device's ability to project vertical and horizontal laser lines, allowing electricians to accurately mark drilling locations on ceilings and sidewalls. By eliminating the need for manual measurements and compensating for structural irregularities, the device ensures precise alignment of conduits with their intended paths. This capability enhances both the accuracy and efficiency of installations, particularly in complex or irregular environments.

The laser alignment device 6 may further include a magnetic attachment mechanism to assist in securing and aligning the device to the electrical conduit 4. As shown in FIGS. 1, 2, and 10-12, a first outer magnet 64 is attached to the outer side of the first foot 30, and a second outer magnet 66 is attached to the outer side of the second foot 38. These outer magnets 64, 66 facilitate attachment of the first and second feet 30, 38 to the inner surface 72 of the electrical conduit 4. Additionally, a first inner magnet 68 is attached to the inner side of the first foot 30, and a second inner magnet 70 is attached to the inner side of the second foot 38. These inner magnets 68, 70 allow the first and second feet 30, 38 to attach to the outer surface 74 of the electrical conduit 4. The use of these magnets provides additional stability when mounting the laser alignment device 6, preventing unintended shifts during alignment.

Figure 3:
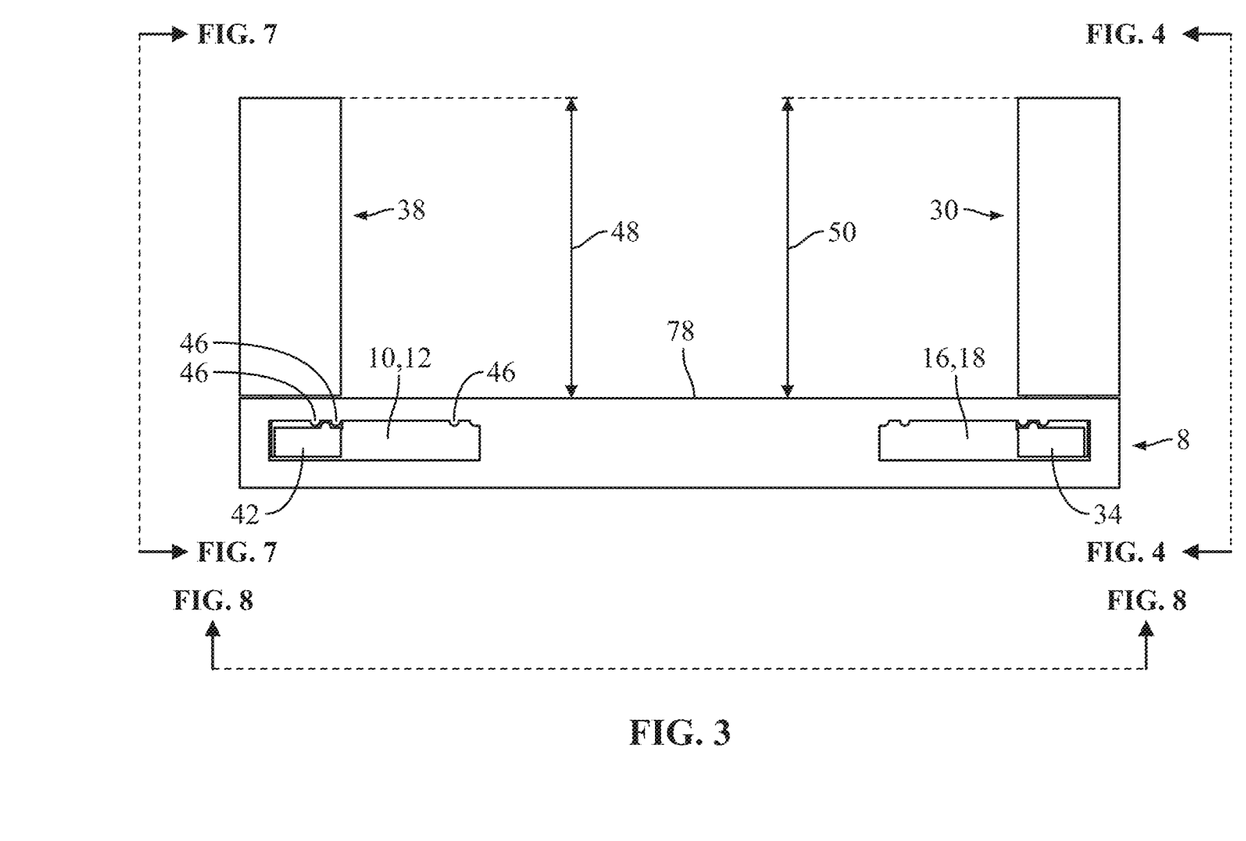
FIG. 3 is a close-up cross-sectional view showing the feet engaging the interior surface of the conduit in the second embodiment, with the spring mechanism biasing the feet outward.
Figure 10:
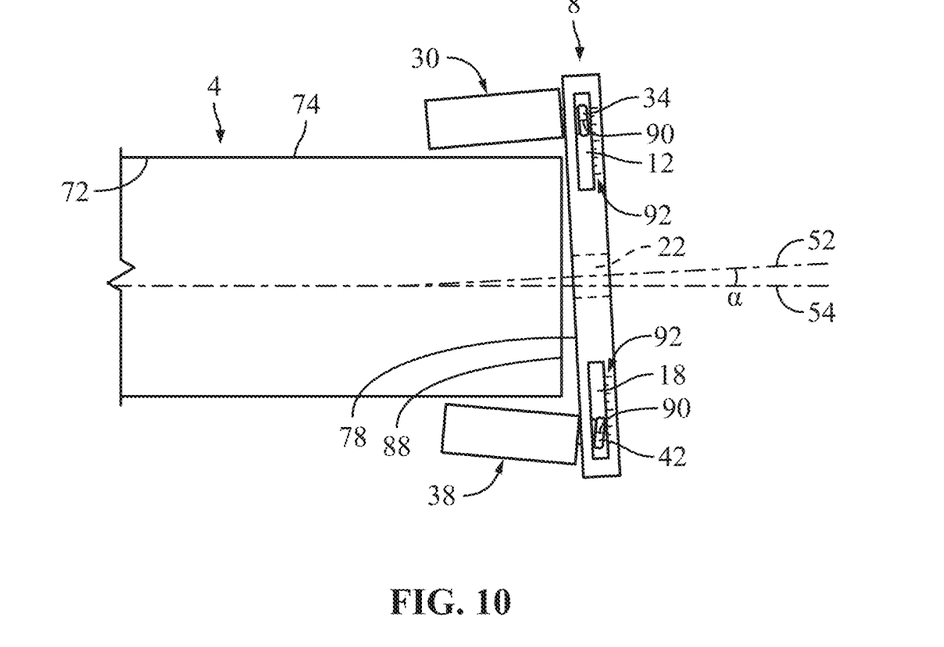
FIG. 10 shows the laser alignment device in an initial misaligned state with skewed feet and skewed laser beam.
Figure 11:
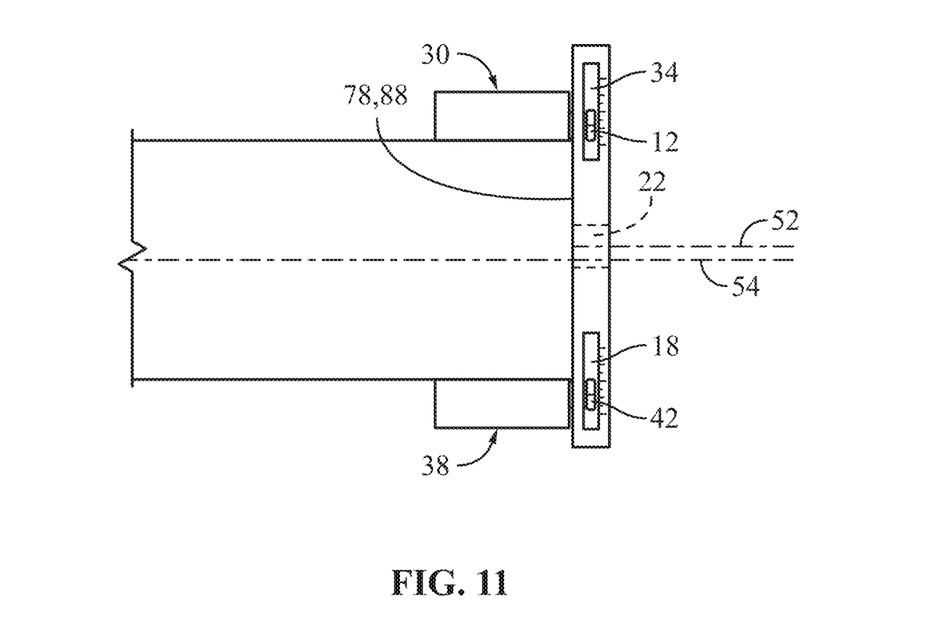
FIG. 11 illustrates the device after manual adjustment, with the feet parallel and the housing butted against the conduit end.

As shown in FIGS. 10 and 11, the first left and right projections 32, 34 of the first foot 30 engage with the first left and right slots 10, 12 in a friction-fit manner, while the second left and right projections 40, 42 of the second foot 38 engage with the second left and right slots 16, 18 in a similar frictional engagement. This design allows the feet 30, 38 to be positioned along the length of the slots 10, 12, 16, 18 and remain in place without additional fasteners. The slots 16, 18 and 10, 12 may have projections 46 (see FIG. 3) along the entire length of the slots 16, 18, 10, 12. The bumps on the left and right projections 32, 34 and 40, 42 interfere with the projectsion 46 to stop movement. The friction fit provides sufficient resistance to prevent unintended movement while allowing controlled adjustment of the feet 30, 38 as needed.

When initially attaching the feet 30, 38 to the conduit 4, the alignment of the device 6 may not be perfect. FIG. 10 illustrates a condition where the feet 30, 38 are skewed relative to the conduit's inner surface 72 or outer surface 74, depending on whether the device is used internally or externally. The user can manually adjust the feet 30, 38 to ensure that their elongate surfaces fully contact the conduit surface (inner or outer surface). This adjustment brings the feet 30, 38 into a parallel position relative to each other and the central axis 54 of the conduit 4, as shown in FIG. 11.

Once the feet 30, 38 are properly positioned on the conduit 4, the housing 8 is pushed against the end 88 of the electrical conduit 4. As shown in FIG. 11, the flat inner surface 78 of the housing 8 is aligned against the end 88, ensuring that the laser beam 52 projects parallel to the central axis 54 of the conduit 4. This step establishes an initial reference alignment before making further refinements.

Figure 12:
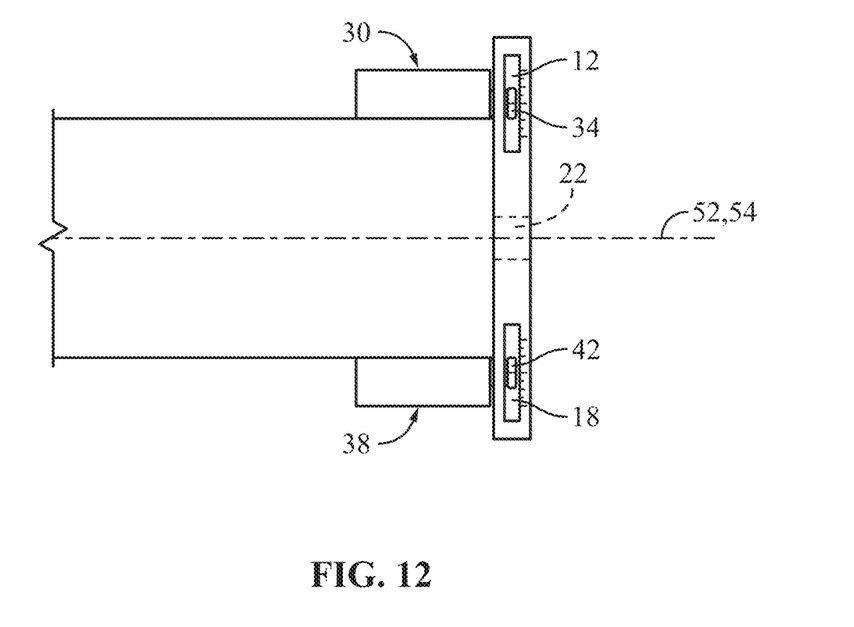
FIG. 12 depicts the final alignment, where the laser beam is coaxially centered with the conduit's central axis using graduation marks.

To achieve precise coaxial alignment of the laser beam 52 with the central axis 54 of the electrical conduit 4, the housing 8 can be adjusted vertically. The user can grip the housing 8 and move it up or down along the conduit 4 until the laser beam 52 is visually centered. As illustrated in FIG. 12, the alignment process is aided by markings 90 on the first left and right projections 32, 34 and the second left and right projections 40, 42, respectively. These markings correspond to a series of gradations 92 on the sides of the housing 8. By adjusting the housing 8 so that the markings 90 align with the same graduation 92 on both sides, the user ensures that the laser beam 52 is coaxially centered with the conduit's central axis 54. For example, in FIG. 11, the markings 90 are aligned to different gradations 92. However, in FIG. 12, the markings 90 are aligned to the same gradations 92 as indicated on the medial side.

To further secure the feet 30, 38 in place after adjustment, additional friction-retention mechanisms may be incorporated. As shown in FIG. 10, locking projections 46 may be positioned within the slots 10, 12, 16, 18 to provide incremental resistance points. The projections 32, 34, 40, 42 of the feet 30, 38 may include mating projections 84, 86, which engage with the locking projections 46. To adjust the feet 30, 38, the user may apply a slight wiggling motion, allowing the projections 84, 86 to move past the adjacent locking projections 46 incrementally. This ensures that once the feet 30, 38 are positioned correctly, they remain in place without unintended movement.

The method of using the laser alignment device 6 to align the laser beam 52 within the conduit 4 follows a structured sequence of steps. First, as depicted in FIG. 10, the feet 30, 38 are attached to the conduit 4. Due to potential misalignment during initial placement, the feet 30, 38 may not be perfectly flat against the conduit's surface. Next, the user manually adjusts the feet 30, 38 so that they make full contact with either the inner surface 72 or the outer surface 74 of the conduit 4. Once this adjustment is complete, the housing 8 is pushed against the end 88 of the conduit 4, as shown in FIG. 11, ensuring that the laser beam 52 is aligned parallel to the central axis 54.

To finalize the alignment, the housing 8 is moved up or down to adjust the position of the laser beam 52 until it is visually centered with the conduit's central axis 54, as illustrated in FIG. 12. The projections 32, 34, 40, 42 each have a mark 90 (see FIG. 10), which is used in conjunction with the graduation marks 92 (see FIG. 10) on the housing 8. When the marks 90 are aligned to the same graduation marker 92, the laser beam 52 is confirmed to be coaxially aligned with the central axis 54, as shown in FIG. 12

The laser alignment device 6, with its combination of magnetic attachment, friction-fit adjustments, and visual alignment guides, provides an intuitive and effective solution for ensuring precise conduit alignment. By integrating magnetic positioning, mechanical friction locks, and visual indicators, the device 6 allows electricians to align electrical conduit quickly and accurately without requiring repeated manual measurements. These features collectively ensure that the laser beam 52 remains stable and properly centered throughout the alignment process, improving efficiency and accuracy in electrical conduit installations.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A laser alignment device for projecting a laser beam coaxially aligned to a central axis of an electrical tube from a first side of a building to a second side of the building, the laser alignment device comprising:
   a housing having a central portion;
   a laser pointer attached to the central portion, the laser pointer being configured to project a laser beam away from the housing and be coaxially aligned to the central axis of the electrical tube;

at least two feet mounted to the housing and biased toward the electrical tube during use.

2. The laser alignment device of claim 1 further comprising a spring mechanism operatively connected to the at least two feet, the spring mechanism being biasing the at least two feet to apply equal force to electrical tube, wherein the equal force centers the housing and the laser pointer coaxially to the central axis of the electrical tube when the feet are mounted to the tube.

3. The laser alignment device of claim 1 further comprising a magnet on each of the at least two feet for attaching the feet to the electrical tube.

4. The laser alignment device of claim 3 wherein the magnets are disposed on outer sides of the at least two feet for attaching the device to an inner surface of the electrical tube.

5. The laser alignment device of claim 3 wherein the magnets are diposed on inner sides of the at least two feet for attaching the device to an outer surface of the electrical tube.

6. The laser alignment device of claim 1, wherein the laser pointer is configured to emit a horizontal laser line, a vertical laser line, or both.

7. The laser alignment device of claim 1, wherein each foot includes a concave inner surface for engaging the outer surface of the electrical tube.

8. The laser alignment device of claim 1, further comprising graduation markings on the housing and markings on the feet to visually indicate when the laser pointer is centered on the housing.

9. The laser alignment device of claim 1, wherein the laser pointer is mounted within a central aperture of the housing.

10. The laser alignment device of claim 1, wherein each of the feet has a marking and the housing has a graduation for each of the feet for assisting in aligning a laser pointer to a central axis of the electrical tube.

11. A method of attaching a laser alignment device to an electrical tube to project a laser beam coaxially aligned to a central axis of the tube, the method comprising:
   providing a laser alignment device comprising:
      a housing having a central portion;
      a laser pointer attached to the central portion, the laser pointer being configured to project a laser beam away from the housing and be coaxially aligned to the central axis of the electrical tube;
      at least two feet mounted to the housing and biased toward the electrical tube during use;
   traversing the at least two feet toward a wall of the electrical tube to position the feet on a surface of the electrical tube;
   placing the feet onto the surface of the electrical tube; and
   centering a laser pointer radially on the electrical tube.

12. The method of claim 11, further comprising aligning markings on the feet with graduation markings on the housing to verify coaxial positioning.

13. The method of claim 11, further comprising the step of adjusting a position of the housing radially with respect to the electrical tube to coaxial align a central axis of the electrical tube to a laser beam of the laser.

14. The method of claim 11, further comprising using the laser beam as a reference to align additional segments of electrical tubing in a straight path across a ceiling or wall.

* * * * *